Aug. 10, 1926.

J. G. VINCENT

HYDROCARBON MOTOR

Filed March 20, 1920

1,595,432

Inventor,
Jesse G. Vincent,

By Milton Tibbetts
Atty.

Patented Aug. 10, 1926.

1,595,432

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

HYDROCARBON MOTOR.

Application filed March 20, 1920. Serial No. 367,444.

This invention relates to hydrocarbon motors and particularly to the oiling systems of such motors.

The invention is of particularly advantageous use in connection with motors used in airplanes, although it is also applicable to motors employed in other vehicles.

The objects of the invention are to provide a construction whereby the oil pump and the principal parts associated therewith in the oil circulating system are readily accessible for removal and particularly to enable convenient access to be obtained to a motor mounted in an airplane fuselage, to provide means for regulating the oil pressure in the system, and otherwise to improve the construction of the parts of an oil circulating system.

With these objects in view, my invention is embodied in preferable form in the arrangement and construction hereinafter described and illustrated in the accompanying drawings.

Figure 1:
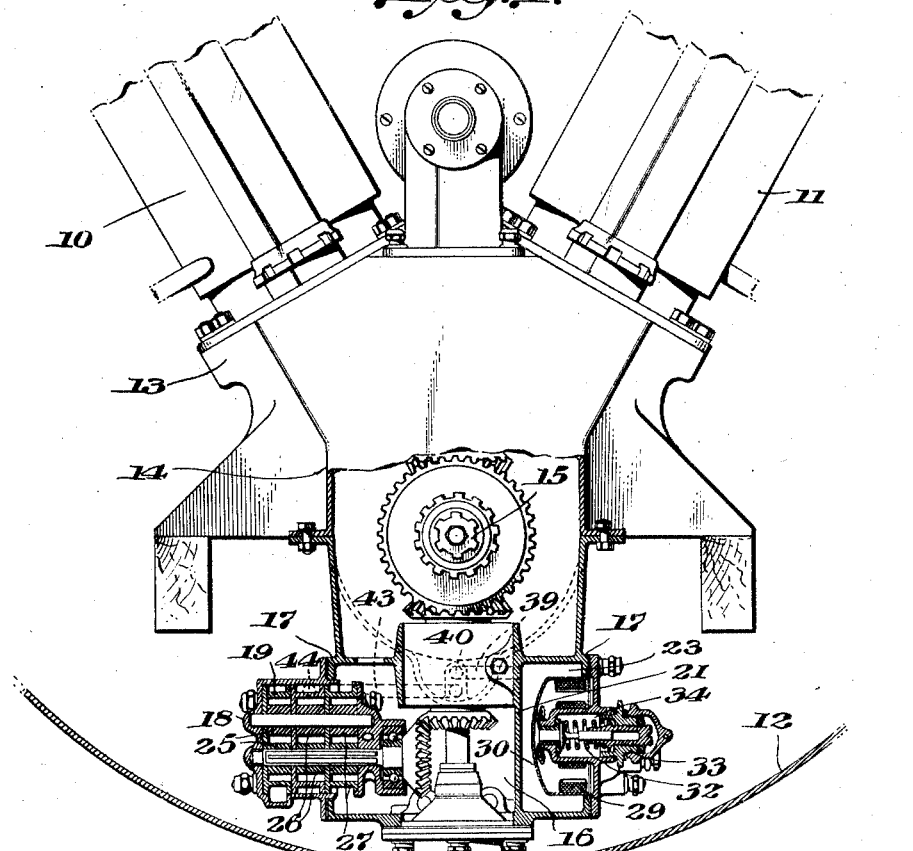
Figure 2:
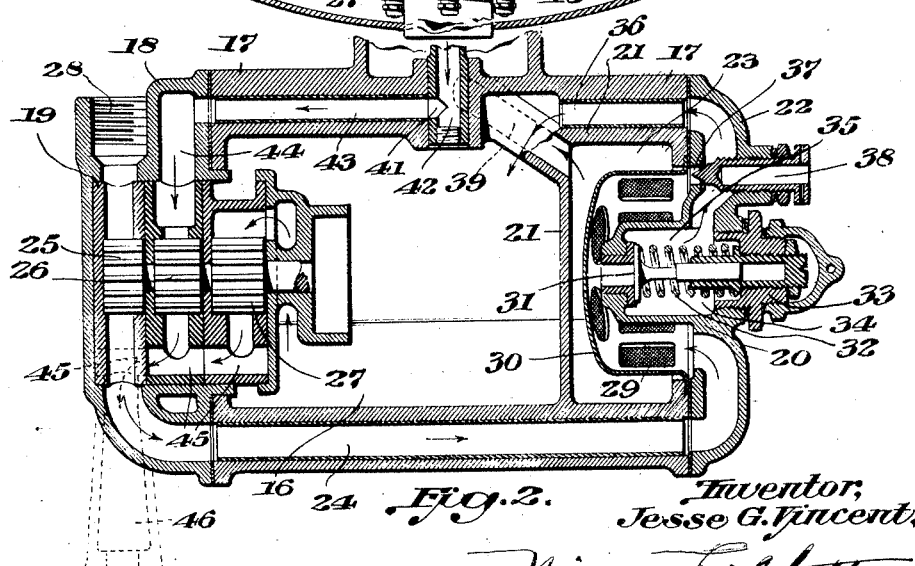

Figure 1 is a vertical sectional view of a hydrocarbon motor showing my improvements applied thereto and taken from one end of the motor, and Figure 2 is a partly sectional and partly diagrammatic view on a somewhat enlarged scale and indicating the course of travel of the oil.

Referring to the drawings, 10 and 11 indicate the cylinders in the two rows of cylinders of a V-type motor, although the invention herein disclosed may be applied to motors of other types. This motor is shown as mounted within a cowling 12, a portion only of which is shown in the drawing. This cowling forms that part of the fuselage of an airplane which constitutes the closed body at the front of the airplane adapted to receive the motor and its associated parts. The lower ends of the cylinders are connected to crank case heads 13 which are integral with the upper half 14 of the crank case within which is mounted the crank shaft 15 of the engine, the bearings of the crank shaft, driving members for the oil pump and other driven elements, and to which is secured the lower half of the crank case having at the lower part thereof a sump body 16. The wall of the crank case inclosing this sump is bulged out on each side of the longitudinal central line of the motor to provide bosses 17 which are open at their outer ends and one of which is adapted to receive a removable casing 18 in which is operatively mounted a three-part oil pump 19. In the other hollow boss, which is directly opposite the boss receiving the pump casing, is adapted to be mounted a removable casing 20. These two casings constitute covers for the open bosses so as to thereby complete the closed body of the crank case. The casing 20 is adapted to carry pressure relief and pressure regulating means for the oil supply, details of which will be hereinafter described.

It will be seen that each casing is disposed at the side of the motor above the bottom line thereof and below and within the vertical outer plane of the cylinders, so that access to the casings may be readily obtained and they may be easily removed through openings in the side of the cowling.

Webs 21 are formed integral with the body of the crank case adjacent the opening in which the casing 20 is mounted and these webs together with the cap or head 22 of the casing 20 constitute a chamber 23 for the pressure relief construction. A conduit 24 leads from the pump to this chamber 23. The pump is of triple construction and has three sets of pump elements 25, 26 and 27 disposed in a line extending transversely of the crank case. As shown in Figure 2, the elements 25 communicate with an inlet 28 adapted to lead from an oil tank not herein shown. The outlet side of the elements 25 communicates with the conduit 24 which leads to the chamber in which the pressure relief devices are mounted. A strainer 29 is mounted in the chamber 23 within a perforate dome 30 which is secured by the clamping of a flange thereof between the casing 20 and the outer face of the crank case. The oil is adapted to traverse this dome and enter the chamber 23 past a pressure relief valve 31 against which bears with a predetermined degree of pressure a spring 32 having also a bearing against a nut 33 threaded into an aperture in the head of the casing 20. The spring is of such strength that when the oil pressure exceeds a certain amount the valve 31 will be opened, permitting a portion of the oil to escape past the valve and into a by-pass chamber 34 formed in the casing 20. From this chamber a passageway 35 leads to a passageway 36 which communicates with the oil sump 16. Communicating with the chamber 23 inside of the dome 30 is a port 37 leading into the passageway 35. The passageway 37 is controlled by a fixed pressure relief valve 38 in the form of a needle valve which is threaded into a threaded opening in the cap 22, and is thereby adjustable. This needle valve is adapted to permit the constant escape of a small quantity of oil past the same back into the sump, the amount of oil thus escaping being determined by the adjustment of the valve. This needle valve relief device is intended to prevent excessively high oil pressure when the motor is idling in which condition the pressure will not be sufficient to open the yieldable pressure relief valve 31.

The main body of the oil, that is that part of the stream which is not relieved by either of the valves, passes through the strainer into the chamber 23 and thence by a passageway 39 to a suitable pipe adapted to communicate with an oil manifold 40, whence the oil passes to the bearings.

The oil is drawn out of the crank case through the opening 41, and thence passes to the passageway 42 which communicates with a conduit 43 leading to a chamber 44 formed in the pump casing 18. This chamber contains the pump elements 26 which thus serve to draw the oil from the front end of the crank case and which then forces the oil from that chamber through passageway 45 into outlet pipe 46 adapted to lead to the oil supply tank.

The third pump element 27 draws the oil from the oil pump 16 and pumps it through passageway 45 into pipe 46 which leads to the oil supply tank as before described.

It will be seen that by this arrangement a fixed but adjustable pressure relief valve is provided, which is adapted to relieve the pressure when the motor is idling. It will also be seen that such a construction and arrangement of the pump and pressure relief devices with reference to the crank case are provided that both these mechanisms are readily accessible and may be readily removed for repair or replacement.

Having thus described my invention, what I claim is:

1. A hydrocarbon motor having a crank case provided with opposite openings in the sides thereof, an oil pump removably mounted in one opening, and an oil relief mechanism removably mounted in the other opening operatively connected to said oil pump.

2. A hydrocarbon motor provided with a crank case having an opening in one side thereof, an oil pump, the pump casing being adapted to close said opening, said crank case having an opening opposite the first opening, an oil pressure relief device mounted in said second opening, and carrying a part adapted to close the latter and means for establishing communication between said pump and said relief device.

3. A hydrocarbon motor having a crank case provided with opposed openings through opposite side walls thereof, a laterally removable oil pump mounted in one opening and adapted to close the same, a laterally removable pressure relief device mounted in and adapted to close the second opening, and a conduit establishing communication between the pump and relief device.

4. A hydrocarbon motor having a crank case provided with opposite openings in its side walls, a removable oil pump and its casing in one opening, a removable member mounted in the other opening and adapted to close the same, a yielding pressure relief device, a fixed pressure relief device carried by said member and operative connections between said pump and said relief device.

5. A hydrocarbon motor having a crankcase provided with an oil sump, an oil pump unit mounted in and extending laterally from said case, said unit comprising three sets of pumping elements, one of said sets receiving oil from the sump and delivering the oil to a source of supply, another of said sets receiving oil from the crankcase and delivering the oil to the source of supply, and the third set receiving oil from the source of supply and delivering oil to the lubrication system.

6. A hydrocarbon motor having a crankcase provided with an oil sump, an oil pump unit disposed horizontally in said crankcase and extending laterally therefrom, said unit comprising three sets of pumping elements, one of said sets receiving oil from the sump and delivering the oil to a said source of supply, another said set receiving oil from the crankcase and delivering the oil to a said source of supply, and the third set receiving oil from the source of supply and delivering the oil to the lubrication system.

7. A hydrocarbon motor having a crankcase, a horizontally disposed oil pump unit mounted in said crankcase and comprising three sets of pumping elements, and a source of supply and connections, two of said sets being adapted to pump oil from the various parts of the crankcase and the third set receiving oil from said source of supply and delivering the oil to the lubrication system.

8. A hydrocarbon motor having a crankcase provided with an oil sump, a pump unit mounted in said crankcase and extending into said sump, said unit including a plurality of sets of pumping elements and a source of supply and connections, said unit being adapted respectively to pump oil from the crankcase and from the oil sump to said source of supply and to pump oil from said source of supply to the lubrication system.

9. A hydrocarbon motor having a crankcase provided with an oil sump, a pump unit mounted in said crankcase and extending into said sump, said unit including a plurality of horizontally disposed sets of pumping elements and connections whereby the pumping elements are adapted respectively to pump oil from the crankcase and from the oil sump to a source of supply and to pump oil from said source of supply to the lubrication system.

10. A hydrocarbon motor having a crankcase, an oil pump unit mounted in and extending laterally into said case and having a plurality of sets of pumping elements, oil pressure relief mechanism extending laterally into said crankcase at the side opposite said oil pump, one of said sets of pumping elements receiving oil from a source of supply and delivering oil to said relief mechanism, and the others of said sets receiving oil from said crankcase and delivering oil to said source of supply.

11. In a hydorcarbon motor having a crankcase having a sump, a pump unit mounted in the sump of said crankcase, said unit comprising means for emptying said oil sump and means for pumping oil through the lubrication system, and oil pressure relief mechanism independently mounted in said crankcase opposite said pump, said pressure relief mechanism being connected in the lubrication system.

12. In a hydrocarbon motor, a crankcase having a pair of oppositely disposed openings therein, a pump unit mounted in one of said openings, and oil pressure relief mechanism mounted in the other opening, a conduit in said crankcase communicating with said relief mechanism and means connecting said pump unit with said conduit.

13. In a hydrocarbon motor, a crankcase having an oil sump and a horizontally disposed pump unit mounted in said crankcase and comprising three sets of pumping elements, the inner set receiving oil from the oil sump and pumping said oil to a source of supply, the central set receiving oil from the crankcase and pumping oil to said source of supply, and the outer set receiving oil from the source of supply and pumping oil to the lubrication system.

14. In a hydrocarbon motor, the crankcase, a pump unit mounted at one side of the lower portion of said crankcase and extending into said case, oil pressure relief mechanism mounted at the other side of the lower portion of the other side and extending thereinto, a conduit leading to the lower portion of one end of said crankcase, said pump unit comprising a plurality of sets of pumping elements, means connecting one of said sets of pumping elements to said conduit and means connecting another of said sets with said oil pressure relief mechanism.

15. In a hydrocarbon motor, the combination with the crank case, the lubrication system, and the oil pump adapted to supply oil to said system, of a by-pass device in said system comprising a yielding relief valve to control the higher pressures in the system and a non-yielding relief means to control the lower pressures as when the motor is idling.

16. In a hydrocarbon motor, the combination with the crank case, the lubrication system, and the oil pump adapted to supply oil to said system, of a by-pass device in said system comprising a yielding relief valve to control the higher pressures in the system and an adjustable non-yielding relief valve to control the lower pressures as when the motor is idling.

In testimony whereof I affix my signature.

JESSE G. VINCENT.